(12) United States Patent
Vitel et al.

(10) Patent No.: US 6,625,441 B1
(45) Date of Patent: Sep. 23, 2003

(54) TELEPHONY SYSTEM WITH A KEY FOR ACCESSING MULTIPLE ANSWERING MACHINES OR MAILBOXES

(75) Inventors: Sandrine Vitel, Le Mans (FR); Jean-Paul Coupigny, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/310,088

(22) Filed: May 11, 1999

(30) Foreign Application Priority Data

May 19, 1998 (FR) .............................. 98 06310

(51) Int. Cl.[7] ................................. H04Q 7/32
(52) U.S. Cl. ............... 455/412.1; 455/413; 455/462; 379/88.25; 379/88.26; 379/67.1
(58) Field of Search ................. 455/412, 413, 455/414, 403, 462, 463, 465, 517, 550, 554, 555, 561, 575, 412.1, 412.2; 345/168; 379/67.1, 74, 88.25, 88.26, 102.01

(56) References Cited

U.S. PATENT DOCUMENTS

| | | | | |
|---|---|---|---|---|
| 5,029,199 A | * | 7/1991 | Jones et al. | 379/88.26 |
| 5,633,917 A | * | 5/1997 | Rogers | 379/74 |
| 5,826,187 A | * | 10/1998 | Core et al. | 455/412 |
| 5,831,598 A | * | 11/1998 | Kauffert et al. | 345/168 |
| 5,987,317 A | * | 11/1999 | Venturini | 455/412 |
| 6,233,318 B1 | * | 5/2001 | Picard et al. | 379/88.25 X |
| 6,405,032 B1 | * | 6/2002 | Buhrmann | 455/413 |
| 6,453,169 B1 | * | 9/2002 | Maloney | 455/575 |

FOREIGN PATENT DOCUMENTS

| | | | | |
|---|---|---|---|---|
| EP | 0443562 A3 | 8/1991 | | H04M/1/72 |
| EP | 0443562 A2 | 8/1991 | | H04M/1/72 |
| JP | 06291831 A | 10/1994 | | H04M/1/65 |

* cited by examiner

Primary Examiner—Nay Maung
Assistant Examiner—Philip J. Sobutka
(74) Attorney, Agent, or Firm—Dicran Halajian

(57) ABSTRACT

A telephone communicates with a base station and a network, each having an answering machine. The telephone has a key and a controller which connects the telephone to the base answering machine of the base station in response to activating the key for a first period of time, and connects the telephone to the network answering machine of the network in response to activating the key for a second period of time.

11 Claims, 2 Drawing Sheets

TELEPHONY SYSTEM WITH A KEY FOR ACCESSING MULTIPLE ANSWERING MACHINES OR MAILBOXES

FIELD OF THE INVENTION

The present invention relates to a telephony system comprising:
  at least a telephone handset, and
  at least a first telephone answering machine.
The invention also relates to a telephone and a handset suitable for such a system.

BACKGROUND OF THE INVENTION

Telephone systems ever more often include telephone answering machines offering more or less the function of voice mailbox.

For this subject, reference can be made to Japanese patent no. 06291831 A.

A problem posed with this type of system is that the user is to consult all the answering machines he has at his disposal, which may be tiresome and imply different procedures he has to remember.

SUMMARY OF THE INVENTION

The present invention proposes a system of the type defined in the opening paragraph in which means are provided for facilitating the user's access to his telephone answering machines.

Therefore, such a telephone is characterized in that the handset includes a control means for triggering the access to at least one of the telephone answering machines when it is activated.

The idea of the invention is to facilitate the use of the system by enabling a user to consult his telephone answering machines by direct commands formed, for example, by a single depression of a key.

BRIEF DESCRIPTION OF THE DRAWINGS

These and other aspects of the invention are apparent from and will be elucidated, by way of non-limitative example, with reference to the embodiments described hereinafter.

In the drawings.

DESCRIPTION OF PREFERRED EMBODIMENTS

Figure 1:
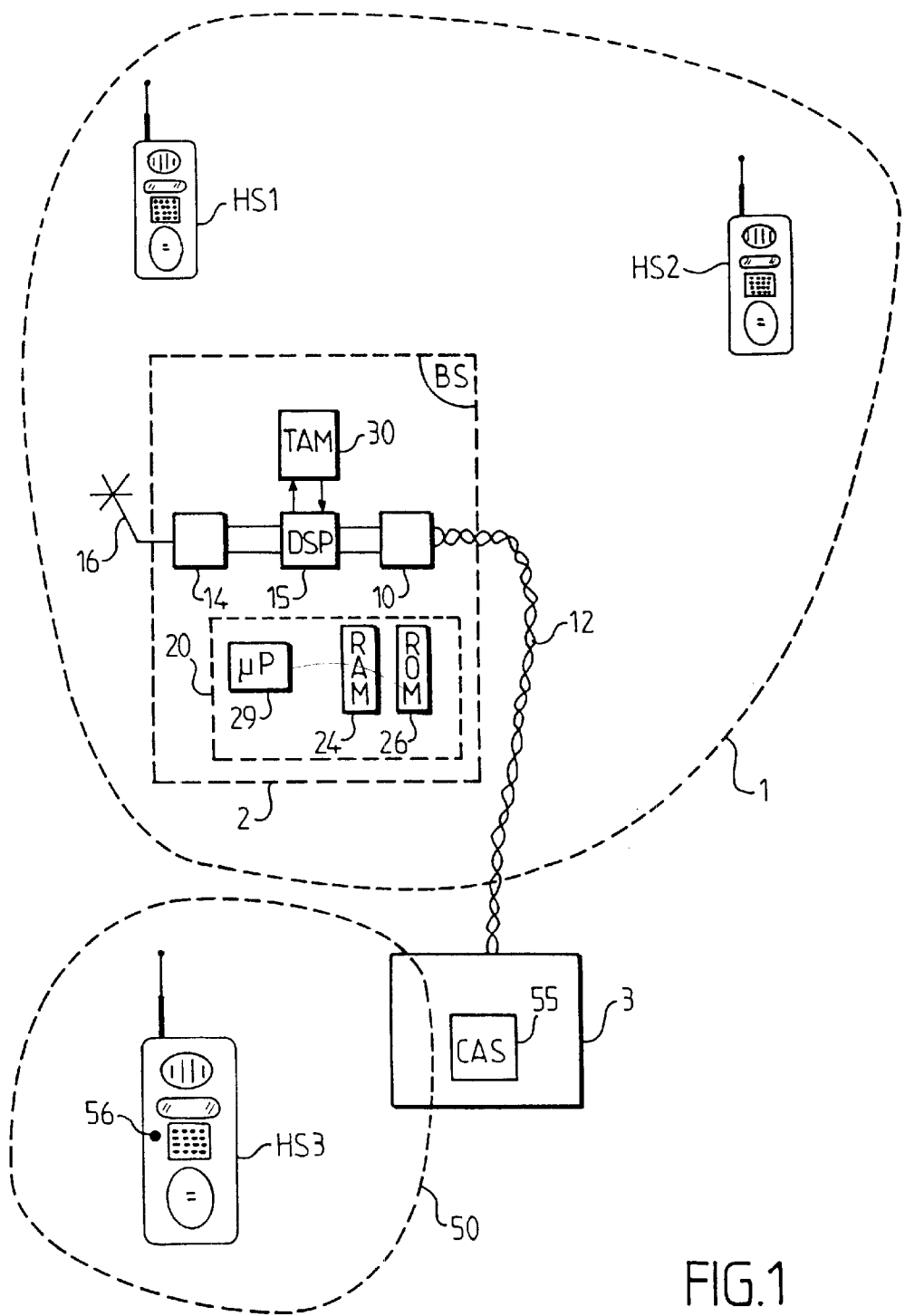
FIG. 1 shows a system in accordance with the invention.

In FIG. 1, a telephone 1 satisfying the DECT standards forms the system that is represented. In the standard ETSI 300 175-5, part 5: "Network layer", one will find various data relating to this type of telephone. Reference 2 shows the base station BS to which may be connected by radio a plurality of handsets, in this example two handsets HS1 and HS2. This base station 2 includes, inter alia, a line circuit 10 that enables it to be connected to a switching exchange 3 that gives access to the switched network via a telephone line 12, and a radio circuit 14 that authorizes the dialogue with the various handsets HS1, HS2 by transmitting and receiving waves via an antenna 16. For processing all the analog data that are in transit inside station 2, a signal-processing element 15 is provided formed around a signal processor DSP that notably processes voice signals. All the elements of the base station are managed by a microprocessor assembly 20. This element is formed, notably in usual manner, by a random access memory 24, a read-only memory 26 containing the instructions for operation of the telephone and a management processor 29. This telephone also includes a telephone answering machine, in essence, formed by a memory 30 of the type known by the name of flash memory.

This memory is thus intended to contain the messages that are necessary for the answering function. This function thus also implies the function of voice mailbox.

The handset HS3 is located in a radio propagation area 50 that enables it to be connected direct to the switched network via the switching exchange 3. But this handset may also be connected to the said base station. For this subject, one can consult the DECT standards ETS 300 824 mentioning the definition of CAP (Access Profile) which makes this service possible.

It is also suitable to mention that the providers of telephone access ever more often install telephone answering machines in their telephone exchanges. The exchange 3, which belongs to this type of provider, includes such a machine carrying reference 55.

According to the invention, for controlling the connection to the telephone answering machine, a control 56 is provided on the handsets. This is only shown for the handset HS3, the other handsets may also have this control.

Thus, if one depresses this button of, for example, the handset HS3 for one second, access will be obtained to one's voice mailbox contained in the telephone answering machine 55.

The status of the handsets HS1 and HS2 is different from that of the handset HS3. If one depresses the button for one second, access will also be obtained to this voice mailbox 55. But, if the button is depressed longer, access will be obtained to the voice mailbox contained in the base station 2.

Figure 2:
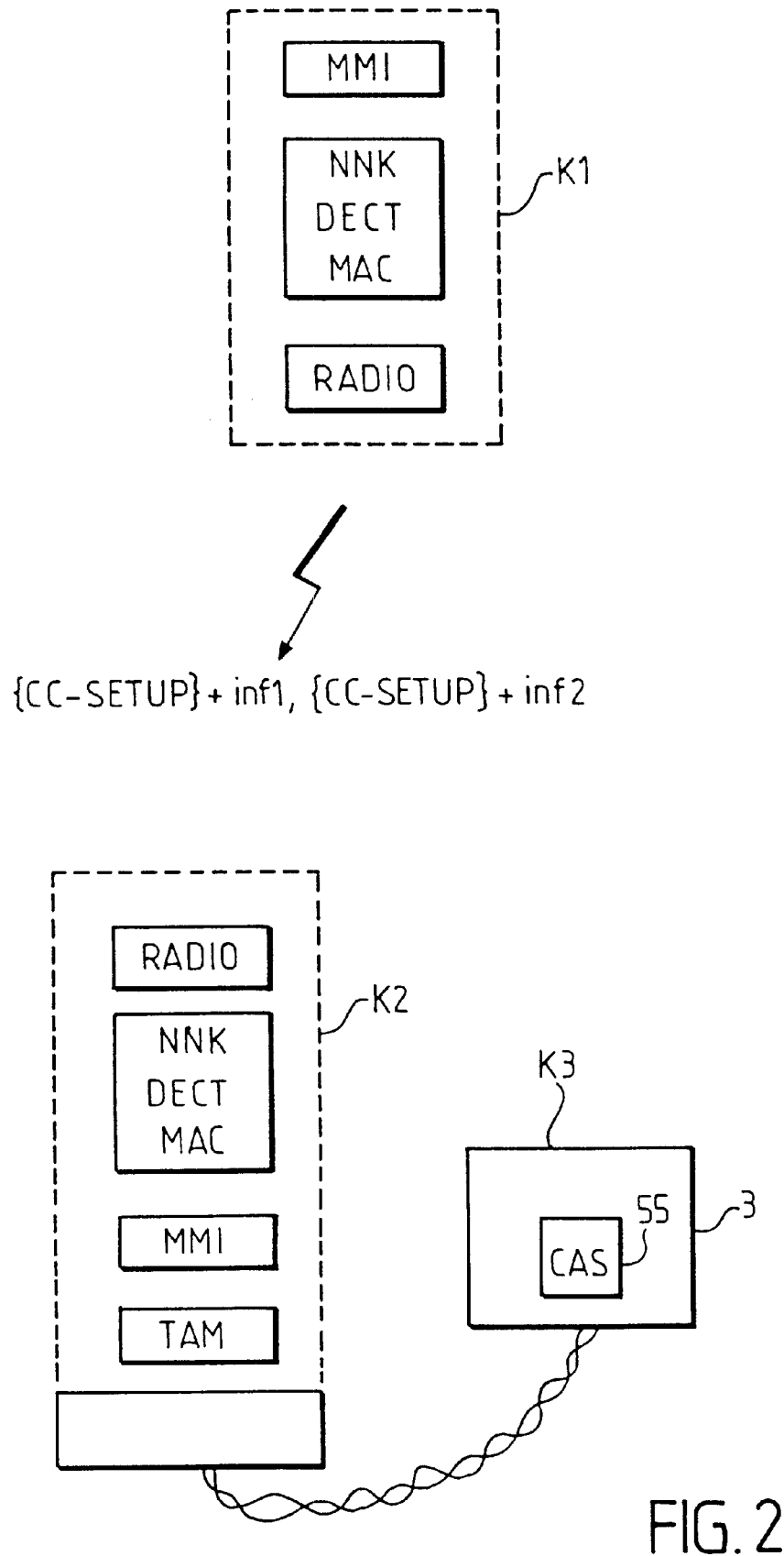
FIG. 2 shows an explanatory diagram of the operation of the system of the invention.

FIG. 2 explains the operation of the system of the invention. Box K1 in this Figure relates to the operation of the handset HS1, for example. The depression of the key is processed by the MMI layer and establishes through various layers of protocol a link by launching the procedure {CC_SETUP} such as described in the standard DECT ETS 300 175-5, paragraph 9.3. To this procedure is added a data <<inf1>> or <<inf2>> which indicates the work to be carried out by the base station BS, that is to say, if one is to be connected to the local voice mailbox TAM or to the voice mailbox 55 of the public switching center CAS.

Box K2 relates to the base station 2 receiving this {CC$_{13}$ SETUP} and examines the message. This is thus either a connection to the local voice mailbox that is effected, or a connection to the remote voice mailbox of the public network (box K3).

What is claimed is:
1. A telephony system comprising:
  a first telephone answering machine;
  a second telephone answering machine; and
  a handset having a control means for triggering access to the first telephone answering machine and the second telephone answering machine;
  wherein, for effecting a first connection to the first telephone answering machine, the first telephone answering machine is activated solely in response to depress- ing a key of said handset for a first period of time, and for effecting a second connection to the second telephone answering machine, the second telephone answering machine is activated solely in response to depressing said key for a second period of time.

2. The telephone of claim 4, wherein said control means provides access to a first mailbox of said first telephone answering machine in response to depressing said key for said first period of time and provides access to a second mailbox of said second telephone answering machine in response to depressing said key for said second period of time.

3. The telephony system of claim 1, wherein depressing said key for said second period of time does not display information related to a function performed in response to depressing said key for said first period of time.

4. A telephone for communicating with a base station and a network, said telephone having a key and a controller which connects said telephone to a base answering machine of said base station solely in response to activating said key for a first period of time and connects said telephone to a network answering machine of said network solely in response to activating said key for a second period of time.

5. The telephone of claim 4, wherein said controller provides access to a first mailbox of said base answering machine in response to activating said key for said first period of time and provides access to a first mailbox of said network answering machine in response to activating said key for said second period of time.

6. The telephone of claim 4, wherein activating said key for said second period of time does not display information related to a function performed in response to activating said key for said first period of time.

7. A communication system comprising:
a handset having a controller and a key;
a first answering machine; and
a second answering machine; wherein said controller connects said handset to said first answering machine solely in response to activating said key for a first period of time and connects said handset to said second answering machine solely in response to activating said key for a second period of time.

8. The communication system of claim 7, wherein said controller provides access to a first mailbox of said first answering machine in response to activating said key for said first period of time and provides access to a second mailbox of said second answering machine in response to activating said key for said second period of time.

9. The communication system of claim 7, wherein activating said key for said second period of time does not display information related to a function performed in response to activating said key for said first period of time.

10. A telephone having a key and a controller, wherein said controller performs a first function in response to activating said key for a first period of time, and performs a second function in response to activating said key for a second period of time, said second function not including information related to operation of said first function, wherein said first function includes connecting to a first answering machine, and said second function includes connecting to a second answering machine.

11. The telephone of claim 10, wherein said second function does not include display of said information related to said operation of said first function.

* * * * *